(12) United States Patent
Wilmot

(10) Patent No.: US 9,044,814 B2
(45) Date of Patent: Jun. 2, 2015

(54) SPINDLE DRIVE APPARATUS AND METHODS

(75) Inventor: Wessley Wilmot, High Peak Derbyshire (GB)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 945 days.

(21) Appl. No.: 13/127,029

(22) PCT Filed: Oct. 26, 2009

(86) PCT No.: PCT/GB2009/051436
§ 371 (c)(1),
(2), (4) Date: Apr. 29, 2011

(87) PCT Pub. No.: WO2010/049724
PCT Pub. Date: May 6, 2010

(65) Prior Publication Data
US 2011/0211928 A1    Sep. 1, 2011

(30) Foreign Application Priority Data

Oct. 29, 2008   (GB) .................................. 0819794.9

(51) Int. Cl.
| | |
|---|---|
| *B23C 3/28* | (2006.01) |
| *B23C 3/32* | (2006.01) |
| *B23Q 5/04* | (2006.01) |
| *B23Q 15/10* | (2006.01) |

(Continued)

(52) U.S. Cl.
CPC . *B23C 3/32* (2013.01); *B23Q 5/045* (2013.01); *B23Q 15/10* (2013.01); *B24B 5/40* (2013.01); *B24B 19/022* (2013.01); *B23C 2270/18* (2013.01)

(58) Field of Classification Search
CPC ...... B23C 2220/363; B23C 3/28; B23C 3/34; B23C 3/124; B23C 1/20; B23C 2215/00; B23C 2220/36; B23C 2270/18
USPC ............. 409/143, 75, 76, 65, 66, 77, 78, 194, 409/193, 215; 173/176, 222
See application file for complete search history.

(56) References Cited

U.S. PATENT DOCUMENTS

| | | | |
|---|---|---|---|
| 2,066,409 A | * | 1/1937 | Loring et al. ................ 166/55.2 |
| 2,372,913 A | | 4/1945 | Schmidt |
| 3,037,429 A | | 6/1962 | Schurger |

(Continued)

FOREIGN PATENT DOCUMENTS

| | | |
|---|---|---|
| DE | 2120133 B2 | 8/1976 |
| DE | 9209821.5 U1 | 11/1993 |

(Continued)

OTHER PUBLICATIONS

International Application No. PCT/GB2009/051436 Search Report and Written Opinion dated Apr. 14, 2010.

(Continued)

*Primary Examiner* — Sunil K Singh
*Assistant Examiner* — Alan Snyder
(74) *Attorney, Agent, or Firm* — Conley Rose, P.C.

(57) ABSTRACT

Systems and methods are disclosed for material treatment within a member or for removal of material from within a member. Embodiments have a spindle powered by a motor or motors positionable within the member during operation of the spindle; and, in certain particular aspects, such systems and methods are for forming a stator for a downhole motor.

21 Claims, 13 Drawing Sheets

(51) Int. Cl.
*B24B 5/40* (2006.01)
*B24B 19/02* (2006.01)

(56) References Cited

U.S. PATENT DOCUMENTS

| | | | |
|---|---|---|---|
| 3,084,631 A | 4/1963 | Bourke | |
| 3,464,313 A | 9/1969 | Shay et al. | |
| 3,499,830 A | 3/1970 | Haggerty et al. | |
| 3,547,798 A | 12/1970 | Haggerty | |
| 3,553,095 A | 1/1971 | Daniel | |
| 3,568,568 A | 3/1971 | Mahler | |
| 3,616,343 A | 10/1971 | Inoue | |
| 3,769,194 A | 10/1973 | Haggerty | |
| 3,896,012 A | 7/1975 | Buschbaum et al. | |
| 4,104,009 A | 8/1978 | Chanton | |
| 4,197,908 A * | 4/1980 | Davis et al. | 166/55 |
| 4,250,371 A | 2/1981 | Haug et al. | |
| 4,376,020 A | 3/1983 | Andrews | |
| 4,391,547 A | 7/1983 | Jackson, Jr. et al. | |
| 4,475,996 A | 10/1984 | Inoue | |
| 4,567,450 A | 1/1986 | Szabo et al. | |
| 4,719,978 A * | 1/1988 | Klemm | 175/113 |
| 4,772,246 A | 9/1988 | Wenzel | |
| 4,909,337 A | 3/1990 | Kochnev et al. | |
| 4,955,951 A * | 9/1990 | Nemoto et al. | 166/55.7 |
| 5,025,548 A | 6/1991 | Justesen | |
| 5,046,903 A * | 9/1991 | Nagayoshi et al. | 409/143 |
| 5,184,927 A | 2/1993 | Judy | |
| 5,238,338 A * | 8/1993 | Stucky | 409/143 |
| 5,240,360 A | 8/1993 | Esser | |
| 5,378,092 A * | 1/1995 | Griner | 409/143 |
| 5,417,281 A | 5/1995 | Wood et al. | |
| 5,611,397 A | 3/1997 | Wood | |
| 5,664,917 A | 9/1997 | Judy | |
| 5,759,019 A | 6/1998 | Wood et al. | |
| 6,019,583 A | 2/2000 | Wood | |
| 6,183,226 B1 | 2/2001 | Wood et al. | |
| 6,230,823 B1 | 5/2001 | Sieniawski | |
| 6,568,076 B2 | 5/2003 | Bottos et al. | |
| 6,644,358 B2 | 11/2003 | Demarest et al. | |
| 6,905,319 B2 | 6/2005 | Guo | |
| 7,249,918 B1 | 7/2007 | Bowman | |
| 7,364,392 B1 * | 4/2008 | Bowman | 409/143 |
| 2001/0003317 A1 * | 6/2001 | Klemm | 173/222 |
| 2003/0089621 A1 | 5/2003 | Anderson et al. | |
| 2005/0079083 A1 | 4/2005 | Lievestro et al. | |
| 2010/0129170 A1 * | 5/2010 | Wilmot | 409/143 |

FOREIGN PATENT DOCUMENTS

| | | |
|---|---|---|
| EP | 0172307 A2 | 2/1986 |
| EP | 0451131 A2 | 10/1991 |
| GB | 2456799 A | 7/2009 |
| JP | 11-48139 A | 2/1999 |
| SU | 525504 A1 | 4/1977 |
| WO | 2008129237 A1 | 10/2008 |

OTHER PUBLICATIONS

Database WPI Week 197745, Thomson Scientific, London, GB; AN 1977-K1097Y; XP002575922.

* cited by examiner

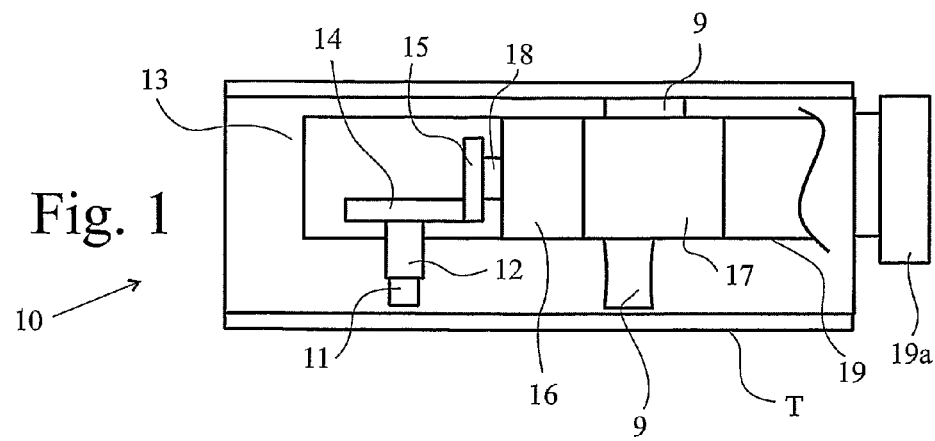
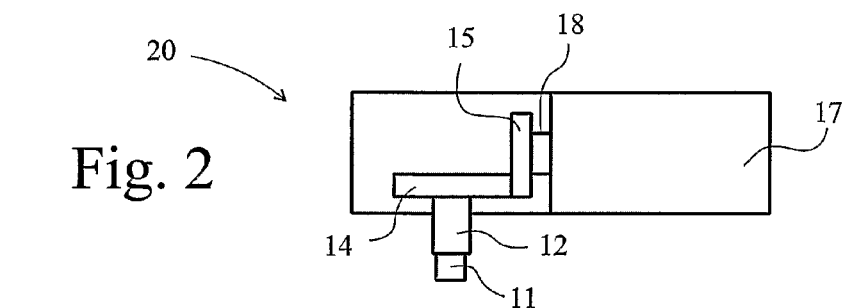
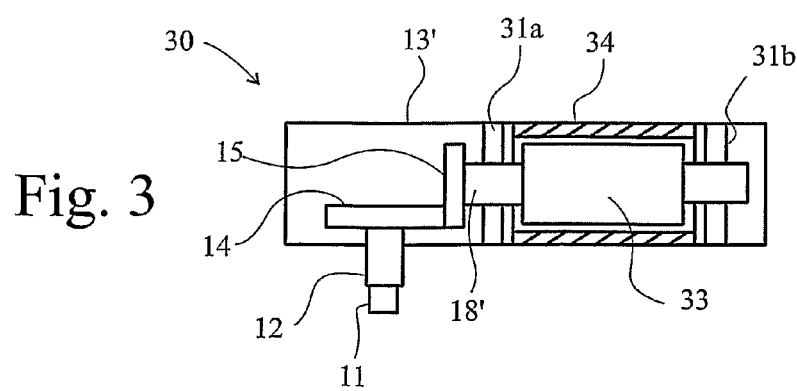

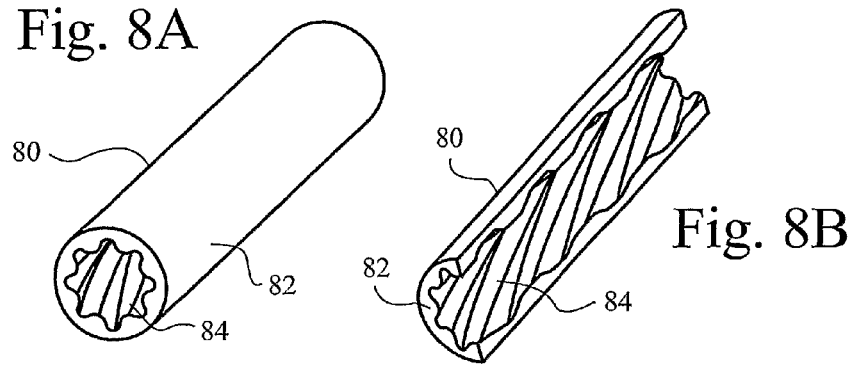
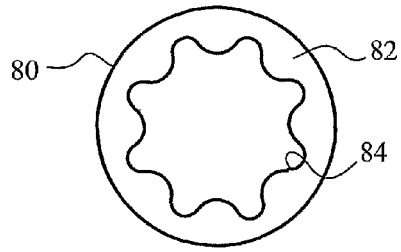
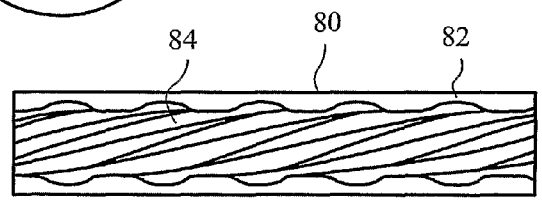
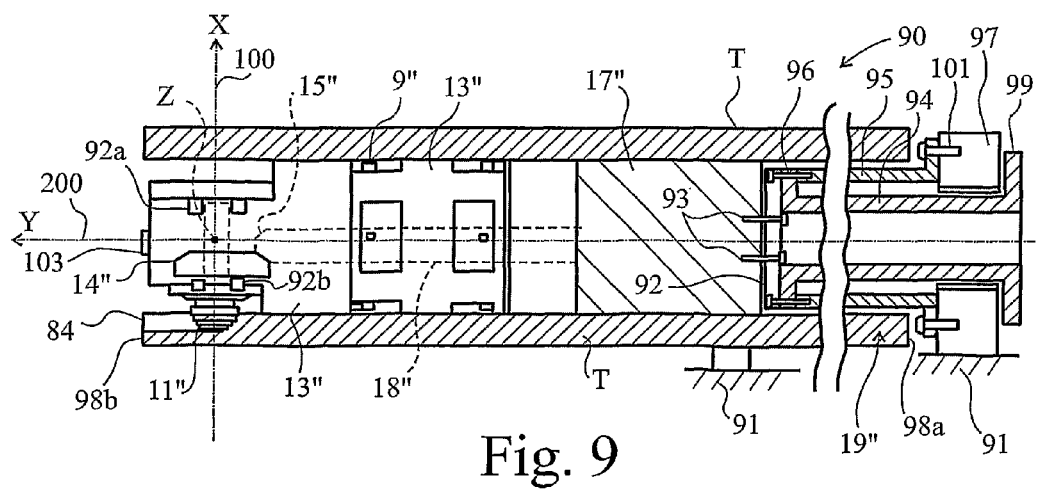

SPINDLE DRIVE APPARATUS AND METHODS

CROSS-REFERENCE TO RELATED APPLICATION

This application is the U.S. National Stage under 35 U.S.C. §371 of International Patent Application No. PCT/GB2009/051436 filed Oct. 26, 2009, which claims priority to GB Patent Application No. 0819794.9 filed Oct. 29, 2008, entitled "Spindle Drive Systems and Methods."

STATEMENT REGARDING FEDERALLY SPONSORED RESEARCH OR DEVELOPMENT

Not applicable.

BACKGROUND OF THE TECHNOLOGY

1. General Field of Endeavor

The present invention is directed to apparatus, systems and methods for material conditioning, material treatment, and material removal, including, but not limited to, polishing, burnishing, surface treatment, grinding, milling and drilling.

2. Description of Related Art

The prior art discloses a variety of conventional extended reach right-angle machining systems, some of which have a limited reach (e.g. about forty inches) and a large external size (e.g. about five inches) for certain applications in removing material internally from a member. Certain prior systems with an extended reach spindle arm made from a single piece shaft and housing have problems due to resonance and vibration, and due to various disadvantages in methods for making such systems.

Certain conventional right-angled machining head designs are suitable for a variety of applications, but some systems with a reach of over forty inches perform ineffectively. The shaft size of some prior systems results in a relatively long shaft with bearing supports at either end which has a low critical speed. Bending or sag in the shaft system can produce whipping of the shaft at even lower speeds. One piece shaft arrangements can have a small cross-sectional area due to housing size and bearing location diameter, which can limit torque and reduce torsional stiffness. Often balancing a relatively long one-piece shaft for operation at high rpm's can be impractical. Since torsional stiffness is required to prevent fatigue, and if cyclic vibration is transmitted to a spindle head, oscillations in the spindle of certain prior systems reduces tool life and spindle head life.

Manufacturing a shaft in one piece can create significant production problems with machining accuracy (e.g. regarding concentricity, circularity, straightness, and parallel locating faces). Differential thermal expansion of a relatively long shaft and housing can cause excessive loads on bearings or promote whipping during operation. With certain relatively long shafts, there are difficulties in providing auxiliary services to a cutting head on the shaft, e.g. providing cooling/lubricating oil for a gearbox; providing coolant for machining tool; and swarf removal.

The prior art discloses a variety of systems for material removal, e.g., but not limited to, as disclosed in and referred to in U.S. Pat. Nos. 2,372,913; 3,037,429; 3,568,568; 5,025,548; 5,240,360; 5,664,917; and German Patent No. DT 2,120,133—all incorporated fully herein by reference for all purposes.

The prior art discloses a wide variety of downhole motors, mud motors, power sections, artificial lift progressive cavity pumps, industrial progressive cavity pumps, parts thereof, and methods for making them, including, but not limited to, those in U.S. Pat. Nos. 3,084,631; 3,499,830; 3,547,798; 3,553,095; 3,616,343; 3,769,194; 3,896,012; 4,104,009; 4,250,371; 4,376,020; 4,391,547; 4,475,996; 4,772,246; 4,909,337; 5,417,281; 5,611,397; 5,759,019; 6,019,583; 6,183,226; 6,230,823; 6,568,076; 6,644,358; 6,905,319; and in U.S. Patent Application Nos. 20050079083 published Apr. 14, 2005; and 20030089621 published May 15, 2003—all said patents and applications incorporated fully herein by reference for all purposes.

A problem with any long reach system is that the stiffness of a given length of material is proportional to the polar second moment of area for the material in question. Unfortunately, the length of members seldom reduce sufficiently compared to the cross section so that the relative stiffness in is maintained. Consequently, on smaller diameter members there is generally an increased problem in trying to achieve a sufficiently stiff system.

SUMMARY OF THE DISCLOSURE

A need has been recognized for an effective and efficient long reach system for material surface conditioning, surface treatment or removal of material from inside a member and, in particular, a system and method for forming a stator for a downhole motor and the internal structure of such a stator. Disclosed are various embodiments of a system and method for material machining processes including, but not limited to, material conditioning or treatment processes and material removal inside a member; and, in certain aspects, systems and methods with a powered spindle to perform primary surface conditioning or treatment processes or material removal processes, e.g., polishing, burnishing, grinding, milling and drilling.

In accordance with one embodiment, there is provided a machining system for machining the interior of a member, the system comprising:

a spindle system positionable within a member, the spindle system including a housing and a rotatable spindle disposed in the housing, and a machining item connected to and rotated by the rotatable spindle, a motor system adjacent the spindle system, the motor system positionable within the member with the spindle system, and the motor system for driving the rotatable spindle within the member to rotate the rotatable spindle and the machining item.

In accordance with another embodiment, there is provided a method for machining a member, the method comprising positioning a machining system as defined above within the member, and energizing the motor to drive the rotatable spindle so that the machining item machines the member.

Certain of the disclosed embodiments include an apparatus with a spindle and tool for location within a member with a motor or motors adjacent or relatively near the spindle, the motor or motors also positioned within the member during operation of the spindle. Certain embodiments provide such operations with a powered spindle movable in a straight/helical path or on a contoured path inside a workpiece, e.g. a tubular member, e.g. to form a stator for a downhole motor or to mill casing or tubing downhole, and, e.g. to mill an exit window for lateral drilling. Certain embodiments disclose machining systems for machining the interior of a member, the systems including: a spindle system positionable within a member (e.g., but not limited to, a tube to be formed into a stator for a downhole motor); the spindle system including a rotatable spindle and a machining item connected to and rotated by the rotatable spindle; a motor system adjacent the spindle system, the motor system positionable within the member with the spindle system; optionally, a steady support and/or gauge means adjacent the motor; and the motor system for driving the rotatable spindle within the member to rotate the rotatable spindle and the machining item (e.g. a milling tool bit, cutting head, borer, or cutter).

Certain embodiments of the systems and methods disclosed herein use an apparatus in which rotary power is provided to a spindle arm connected to a tool spindle which is inclined at an angle negative or positive from the perpendicular or equal to the perpendicular of the axis of the spindle arm.

Certain of the systems and methods disclosed herein may be used to make a stator for a downhole motor.

Accordingly, the disclosed embodiments include features intended to enable them to advance material treatment and removal technology and drilling fluid pumping technology. Characteristics and advantages of the disclosed embodiments described above and additional features and benefits will be readily apparent to those skilled in the art upon consideration of the following detailed description of the disclosed embodiments and referring to the accompanying drawings.

BRIEF DESCRIPTION OF THE SEVERAL VIEWS OF THE DRAWINGS

A more particular description of certain embodiments of the invention briefly summarized above may be had by references to the embodiments which are shown in the drawings which form a part of this specification. These drawings illustrate certain embodiments and are not to be used to improperly limit the scope of the invention which may have other equally effective or equivalent embodiments.

FIG. 1 is a side schematic view of a system according to certain embodiments of the present invention.

FIG. 2 is a side schematic view of a system according to certain embodiments of the present invention.

FIG. 3 is a side schematic view of a system according to certain embodiments of the present invention.

FIG. 8A is a perspective view of a stator for a downhole motor made with a system and method according to certain embodiments of the present invention.

FIG. 8B is a cutaway view of the stator of FIG. 8A.

FIG. 8C is an end view of the stator of FIG. 8A.

FIG. 8D is a longitudinal cross-section view of the stator of FIG. 8A.

FIG. 9 is a cross-section view of a system according to certain embodiments of the present invention.

Figure 4:
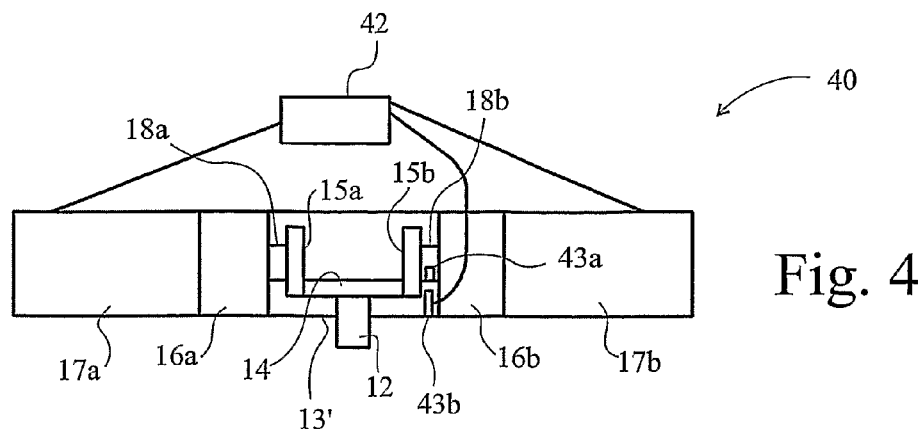
FIG. 4 is a side schematic view of a system according to certain embodiments of the present invention.

Exemplary embodiments of the invention are shown in the above-identified figures and described in detail below. Various aspects and features of these embodiments are disclosed herein. So long as they are not mutually exclusive or contradictory, any aspect or feature or combination of aspects or features of any embodiment disclosed herein may be used in any other embodiment disclosed herein It should be understood that the appended drawings and description herein are not intended to limit the invention or the appended claims. On the contrary, the intention is to cover all modifications, equivalents and alternatives falling within the spirit and scope of the invention as defined by the appended claims. In the figures, like or identical reference numerals are used to identify common or similar elements. The figures are not necessarily to scale and certain features and certain views of the figures may be shown exaggerated in scale or in schematic in the interest of clarity and conciseness.

DETAILED DESCRIPTION OF THE DISCLOSED EMBODIMENTS

FIG. 1 shows a system 10 made according to one embodiment of the present invention. System 10 includes a driven spindle 12 with an tool bit 11 mounted thereon for treating and/or removing material from a tubular member T within which the system 10 is located. The tube T may have any internal and external cross section, provided the internal cross section has a constant profile along its length. Indeed, in some embodiments, the tube need not even necessarily be open at both ends. The tool bit 11 may be, for example a bit, milling head, cutting head, cutter, burnisher, polisher or borer and is hereinafter referred to, without intending any limitation thereby, as a tool bit). A motor 17 (e.g., in one aspect, a synchronous motor; e.g. in one aspect a 33.4 KW, 11,100 rpm synchronous motor) is coupled to a gear system 16 which has a drive shaft 18 with a bevel gear 15. The bevel gear 15 meshes with a corresponding bevel gear 14 on the spindle 12 to rotate the spindle 12 and the tool bit 11. The spindle 12 is journalled for rotation in a housing 13.

A support or "steady" system 9 (and/or gauge means) supports the system 10 within the tube T. Any suitable support or steady system may be used, including, but not limited to, the steady system as disclosed in PCT/GB2008/001278 referred to above. Such a steady support 9 or any support or gauge means disclosed or referred to herein may be used with any embodiment disclosed herein. The support 9 is shown on the motor 17. However, it may equally be on the gearbox housing 16, the spindle housing 13 or an extension (no shown) thereof. An extension tube 19 is connected to the motor 17 and reaches back to a machine tool carriage 19a (shown schematically) outside of the member 10.

In one particular aspect the tube T is made of machinable material, e.g. a plastics material such as PEEK. It may be metal, e.g. steel, such as for a stator for a downhole progressive cavity motor. For example, a system according to one embodiment of the present invention (or any disclosed herein) may be used to form a stator 80 (see FIGS. 8A-8D) having a body 82 with a lobed interior channel 84 that is machined from a circular-profiled start tube.

The stator 80 for which a system according to this disclosure is particularly suited is one having an internal diameter between about 5 and 20 centimeters. Above 20 centimeters, a system as described in PCT/GB2008/001278 is adequate, for reasons explained below. On the other hand, there is no upper limit in principle to the application of the present invention.

FIG. 2 shows a system 20, made according to one embodiment of the present invention, similar to the system 10 previously described. However, here, the motor 17 directly drives the spindle 12 via drive shaft 18, bevel gear 15 and bevel gear 14 on the spindle 12. There is no gearbox and consequently this system either employs a lower speed motor, or the tool bit 11 is, in this embodiment, one that operates at higher speed.

FIG. 3 illustrates a built-in motor system 30, in which the housing 13' is provided with bearings 31a,b mounting an armature shaft 18' on which a rotor 33 is mounted. A stator 34 is also mounted in the housing 13'.

Suitable motors and stator/rotor combinations are available and known and one supplier is Siemens AG (e.g. their 1FE1 motors, see for example http://www.automation.siemens.com/mc/mc-sol/en/f572aaf5-4af6-4948-b42d-756399832445/index.aspx, although other suppliers exist.

FIG. 4 shows a system 40 made according to one embodiment of the present invention, which has two motors 17a,b, each with a corresponding gear system 16a,b, respectively. Bevel gears 15a,b, on drive shafts 18a,b, respectively, drive a single common bevel gear 14 on the spindle 12. The bevel gears 15a,b, and 14 (any of which may be a spinal bevel gear) are within a housing 13' from which the spindle 12 projects.

In one particular aspect, the gear boxes 16a,b are either or both an epicyclic gearbox, and provide a speed reduction from the motors 17a,b to the shafts 18a,b. Torque at the spindle 12 can be calculated by multiplying the motor torque with the gearbox ratio.

A feature of synchronous motors is that they have a constant torque, at least up to a certain speed. It follows that the maximum power range of the motor occurs at that speed and beyond. It is therefore desirable to operate the motor at a constant velocity close to or above its maximum torque speed. In most machining operations, there cannot be too much torque, but there can sometimes be inadequate torque. In any event, one motor, say motor 16b, is employed as a constant speed motor and has its gearbox 16b arranged to drive the spindle 12 at a desired rotation speed that corresponds with the maximum speed of the motor 16b.

A shaft encoder 43a,b, or, for example, a Hall effect device 43a and corresponding sensor 43b, may be arranged to sense the speed of the motor 16b.

The other motor, motor 16a may simply be provided to add torque and is used in a "torque" mode. Thus, during normal operation, motor 17a may not be energized significantly. However, should, during operation of the system 40, the speed of the system fall, as detected by the encoder 43a,b and transmitted to a control mechanism 42, a torque enhancement mode is introduced by the mechanism 42. This serves to activate motor 17a, which is then driven to add further torque to the bevel gear 14, until such time as the desired target speed of the spindle 12 is re-established.

However, in practical systems, it is likely that both motors will be driven together, each providing about 50% of the required torque. Preferably, crown gear 14 has an odd number of teeth (assuming motors 17a,b are directly opposed to one another, 180° apart around the gear 14). In this event, the opportunity for any backlash is minimized because at least one gear 15a,b is in full engagement with the crown gear 14 and both are in contact therewith at all times. Indeed, preferably, the gears 14,15a,b are spiral bevel gears and it is, in any event, desirable for the meshing of the various gears in the system to be tight so that backlash in the system is eliminated or at least minimized.

Figure 5:
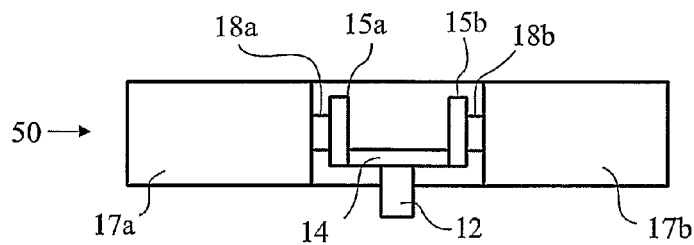
FIG. 5 is a side schematic view of a system according to certain embodiments of the present invention.

FIG. 5 shows a system 50 made according to one embodiment of the present invention and similar to the system 40 previously described, but without gear boxes between motors 17a,b and bevel gears 15a,b. In certain aspects this reduces the available torque (as compared to the system 40), but can correspondingly increase the possible driving speed of the spindle 12.

Figure 6:
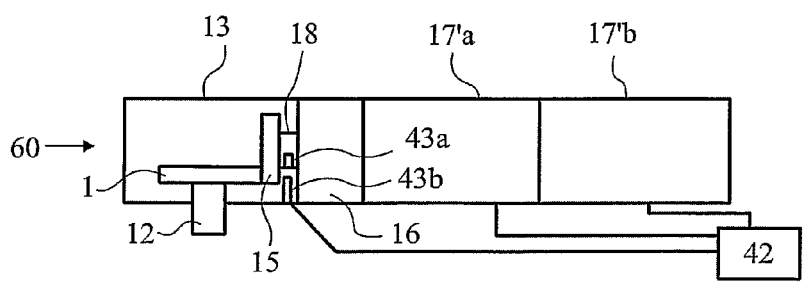
FIG. 6 is a side schematic view of a system according to certain embodiments of the present invention.

FIG. 6 shows a system 60 made according to one embodiment of the present invention in which two motors 17'a,b are in series and drive a drive shaft 18 and bevel gear 15 via a gear system 16. Such a system provides the same advantage of speed maintenance as that described above with reference to FIG. 4, but not of backlash control. For example, motor 17'a could be arranged to drive at a constant speed, possibly under the control of mechanism 42. However, such mechanism 42 detect a reduction in speed of the spindle 12 through the sensor system 43a,b, the motor 17'b is activated to add torque.

Figure 7:
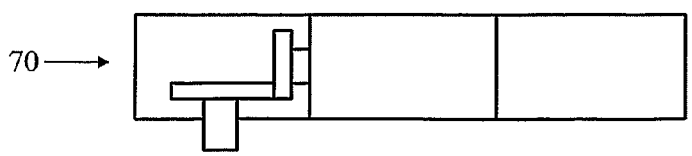
FIG. 7 is a side schematic view of a system according to certain embodiments of the present invention.

FIG. 7 shows a system 70 made according to one embodiment of the present invention, and similar to the system 60 previously described, but without a gear system.

As shown in FIG. 9, a system 90 made according to one embodiment of the present invention and having a motor 17" with a drive shaft 18" (shown schematically) driving a spindle 12" through bevel gears 14",15". The spindle 12", when driven by the shaft 18", drives a milling tool bit 11" to mill away material from the interior of a tube T to form a groove 84.

It will be understood by those skilled in the art that, in a system such as that shown, there are three orthogonal reaction forces caused by the cutting operation effected by the bit 11". The first is a reaction perpendicularly away from the surface being machined, in the direction of the arrow X parallel (in this case, but not necessarily so) the axis 100 of rotation of the spindle 12". The second is in a direction orthogonal thereto in the direction of the arrow Y parallel the axis 200 of the tube T. The third reaction force is in a direction orthogonal to both in a direction (not shown) into or out of the plane of the drawing of FIG. 9 (Z axis).

As described above, there is a fourth reaction effect, which is the potential rotation reaction of the cutter 11" about its own axis 100. Each of these reaction forces must be resisted by the structure of the system 90 if the milling cutter 11" is to mill a true course and if vibration and wear is to be minimized.

A steady support (or gauge means) 9" supports the system in the tube T and, in one aspect, may comprise the arrangements as described in co-pending International Patent Application No. PCT/GB2008/001278, extracts of which are in the Appendix hereto, or in our copending application filed on the same date as this application and with the same applicant and inventor, filed under the reference P123xxxGB, the entire contents of both of which (as well as the Appendix hereto) are incorporated fully herein by reference for all purposes. The gauge means 9" tracks the interior of the tube T to facilitate machining thereof and to maintain the position of the bit 11" with respect to the tube T. The gauge means 9" provides the requisite resistance to the first reaction force described above, i.e. that in the direction of the arrow X.

The reaction force in the direction of the arrow Y manifests itself in two ways. The first is as a bending moment about the Z axis, orthogonal the directions X,Y. To counter this is required strong and precise bearings 92a,b of the spindle 12", a rigid housing 13 in which the bearings are disposed, and the steady support 9" that resists rotation of the housing about the Z axis. The second is in tension of the shaft 19 that connects housing 13" to ground 91 (or compression if the system is employed in a push-mode rather than in pull-mode).

In one embodiment (see FIG. 9), the motor 17" is connected to a plate 92 by screws 93. The plate 92 is connected to two concentric pipe members 94,95 by screws 96. The other end of the pipe member 95 is connected to a base 97 by screws 101, beyond an open end 98a of the tube T. The base 97 is fixed relative to the ground 91, as is the tube T, except that tube T and/or base 91 are able to be selectively moved by the user relative to one another along the Y direction.

Thus, to commence a machining operation, system 90 is inserted into the tube T (with the cutter 11" absent) until the housing 13" protrudes from the other end 98b of the tube. The cutter is then inserted into a socket (not shown) on the end of spindle 12", and the motor 17" started. Cables (not shown) connect to the motor through the bore of the pipe member 94. They carry current to drive the motor, and signals to and from the motor to control the motor and provide information about the cutting process from sensors (not shown) positioned on the motor and/or housing 13". For example, the sensors may comprise one or more of a temperature sensor or probe, a vibration sensor or probe, a speed sensor and a position sensor etc. However, one sensor is shown, inclinometer 103 attached to the front of the cutter housing 13". Inclinometer 103 senses rotational position of the housing 13" (and therefore rotational position of the cutter 11") about the Y axis. This is communicated to a control system (not shown).

When the motor 17" is energized, cutting is commenced by drawing the housing 13" through the bore of the tube T, milling the groove 84. This is achieved by moving base 97 relative to ground 91. Base 97 may comprise a slidable table, for example. Thus, the second aspect of the reaction force in the direction of the arrow Y is resisted by the tension in the pipe member 95 as provided by the axial separation of the base 97 from the tube T. It is, of course, desirable, that the pipe member 95 is not elastic but relatively rigid so that there is reduced tendency for vibration to develop in the Y direction.

The reaction force in the Z direction manifests itself as a twisting moment about the Z axis. The direction of twist is a function of the direction of rotation of the tool bit 11". This force is resisted by the torsional stiffness of pipe member 95, as well as the torsional stiffness of the motor 17" and housing 13". However, in whichever direction it is, the torsional stiffness is proportional to the polar second moment of area of the pipe member 95, which is, of course, limited by the diameter of the tube T. As the diameter reduces, the potential stiffness reduces as an exponential function of the diameter. Consequently, torsional stiffness is a particular problem with small diameter tubes.

Indeed, it is a significant reason why embodiments disclosed herein dispose the driving motor down the length of the tube to be machined. In one respect, twist of a driven shaft is hardly more problematic, in terms of torsional stiffness, than twist of a mounting shaft as described herein. However, two advantages of shortening the driving shaft and disposing the motor down the length of the tube or member to be processed are felt, and these are as follows. The first is that the driven shaft, particularly as proposed in PCT/GB2008/001278, is mounted inside a supporting tube, so it already has a reduced diameter compared with the tube 95 as shown in FIG. 9. Instead, the disclosed embodiment achieves a supporting tube 95 that can be as close to the bore diameter of the tube T as possible, whereby its diameter is maximized. Secondly, embodiments disclosed herein torsionally pre-stress the pipe member 95 and dynamically adjust its angular position to maintain the position of the cutter 11". The pre-stressing should be in the direction of the reaction force so that to deflect the pipe member about the axis 200 a substantial force must be applied.

Figure 10A:
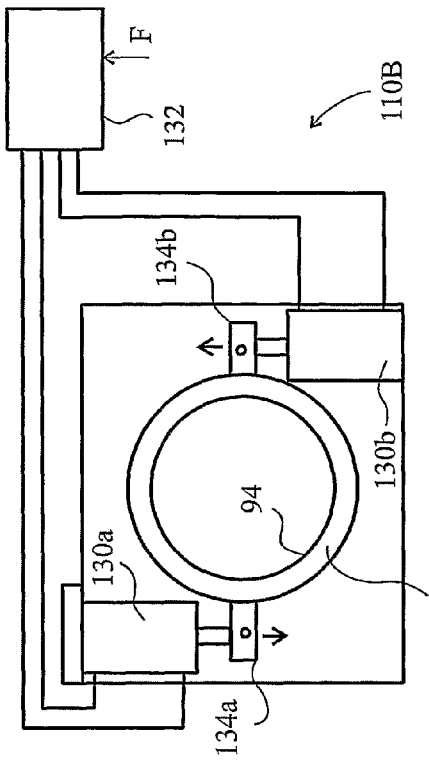
FIGS. 10A, B and C are alternative anti-twist systems according to certain embodiments of the present invention.
Figure 10C:
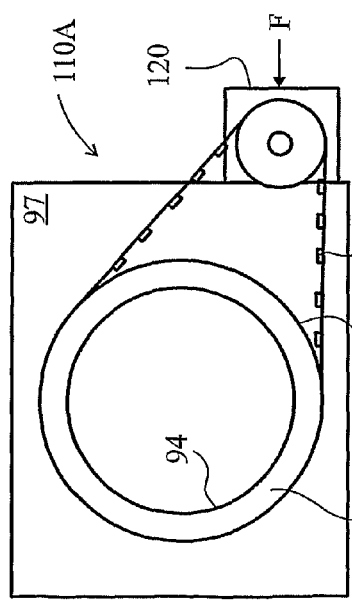
Figure 10B:
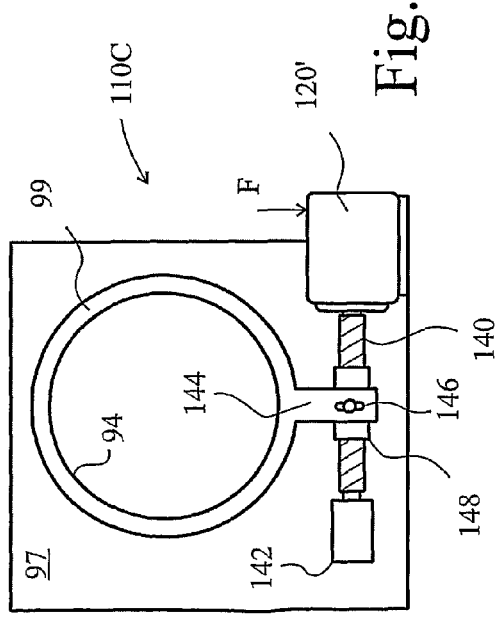

The inner pipe member 94 provides the pre-stressing in the embodiment of FIG. 9. Referring to FIGS. 10A to C, different tools for pre-stressing pipe member 94 are shown. In FIG. 10A, system 110A includes a servo-motor 120 driving a timing belt 122, wound around a gear 125 on flange 99. Servo-motor 120 is driven by command (F) of the control system (not shown) in response to changes in the position of inclinometer 103.

In FIG. 10B, a hydraulic or pneumatic system 110B is shown, in which cylinders 130a,b are switched by control 132, also under command F, to act on levers 134a,b connected to flange 99.

Finally, in FIG. 10C, screw system 110C comprises another servomotor 120' fixed to base 97 and driving one end of a lead screw 140 whose other end is supported in bearing housing 142 also fixed to base 97. A lever arm 144 is fixed to flange 99 and, through slidable and rotatable connection 146, is also connected to nut 148 threaded on the screw 140. Command F operates motor 120' serving to twist pipe member 94 relative to the base 97, The pipe system represented in FIG. 9 by pipe members 94,95 is shown in FIG. 9 connected to a single motor (17") not including a gearbox. However, it will be appreciated that any of the arrangements described above with reference to FIGS. 1 to 7 may be employed with the pre-stressed pipe system of FIGS. 9 and 11.

Thus, referring back to FIG. 9, twisting of pipe member 94 counteracts any twisting of the pipe member 95, pre-stressing it to resist turning of the cutter housing in the tube T responsive to the reaction of the cutter 11" about the Y axis.

Figure 11:
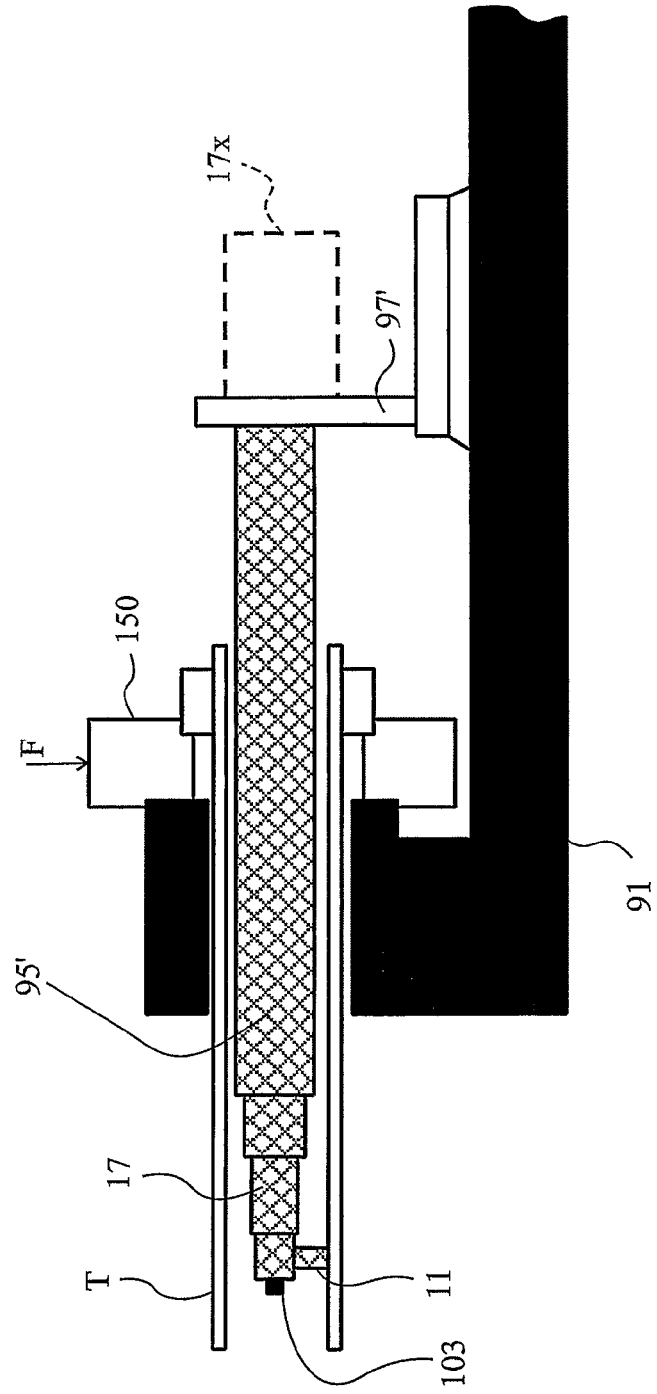
FIG. 11 is a further alternative anti-twist system according to certain embodiments of the present invention.

FIG. 11 illustrates an alternative arrangement where twin pipe members 94,95 are not required. Indeed, this system works just as well if the motor is disposed inside the tube T or outside, as with the systems described in PCT/GB2008/001278. Here, inclinometer 103 senses rotational position of the cutter 11 and responsive thereto, command F from the (not shown) control activates chuck 150 mounting tube T relative to ground (that is, machine bed) 91. Thus, while the reaction force about the Y axis may indeed twist mounting shaft 95' relative to base 97' located on machine bed 91, the rotational position of the workpiece T is changed to compensate. As mentioned above, this arrangement works even when the motor is tool drive motor 17x mounted on the base 97' (as described in PCT/GB2008/001278) or when the motor 17 is inside the workpiece T as described herein. This aspect is not, therefore, limited to the motor inside the tube T.

Embodiments disclosed herein are not limited to any particular individual feature, but instead include combinations of them distinguished from the prior art in their structures, functions, and/or results achieved. Certain features of the disclosed embodiments have been broadly or generally described so that the more detailed descriptions disclosed herein may be better understood. There are, of course, additional aspects of the various embodiments described above and which may be included in the subject matter of the claims to this invention. Those skilled in the art who have the benefit of reading this patent application will appreciate that this disclosure may be used as a creative basis for designing other structures, methods and systems for carrying out and practicing the present invention. The claims of this invention are to be read to include any legally equivalent devices or methods.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of this disclosure. The Abstract is neither intended to define the invention, nor is it intended to be limiting of the scope of the invention in any way.

It will be understood that the various embodiments of the present invention may include one, some, or all of the disclosed, described, and/or enumerated features and/or elements disclosed herein.

Certain changes can be made in the subject matter without departing from the spirit and the scope of this invention as defined by the claims. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. All patents and applications identified herein are incorporated fully herein by reference for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are including, but items not specifically mentioned are not excluded. A reference to an element by the indefinite article "a" does not exclude the possibility that more than one of the element is present, unless the context clearly requires that there be one and only one of the elements.

APPENDIX

Extracts from specific description of PCT/GB2008/001278

Figure 12:
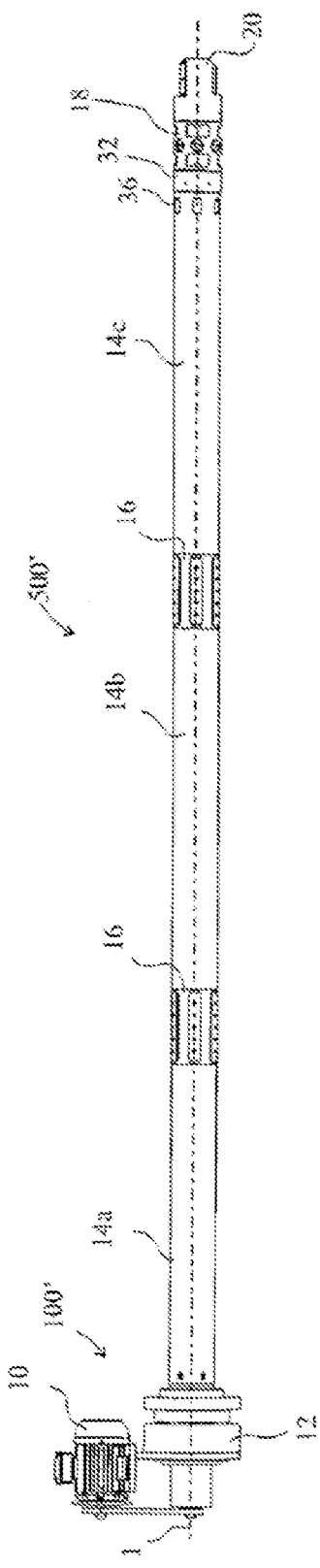
FIGS. 12 to 20 are referred to and described in the Appendix hereto.
Figure 13:
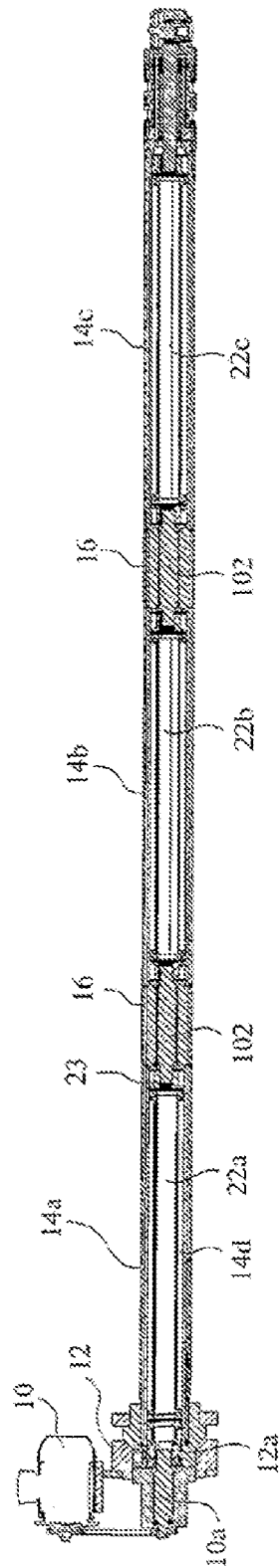
Figure 14:
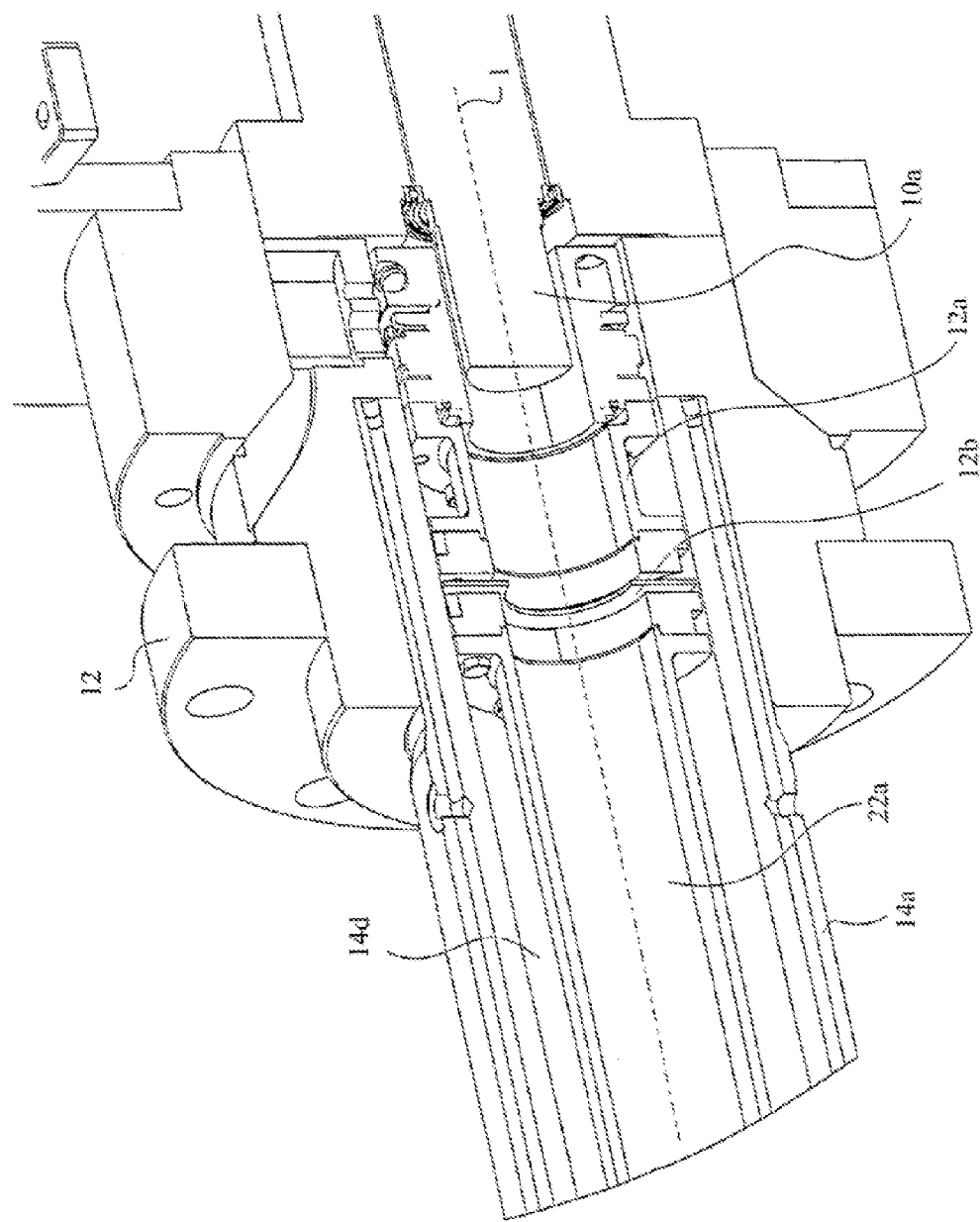
Figure 15:
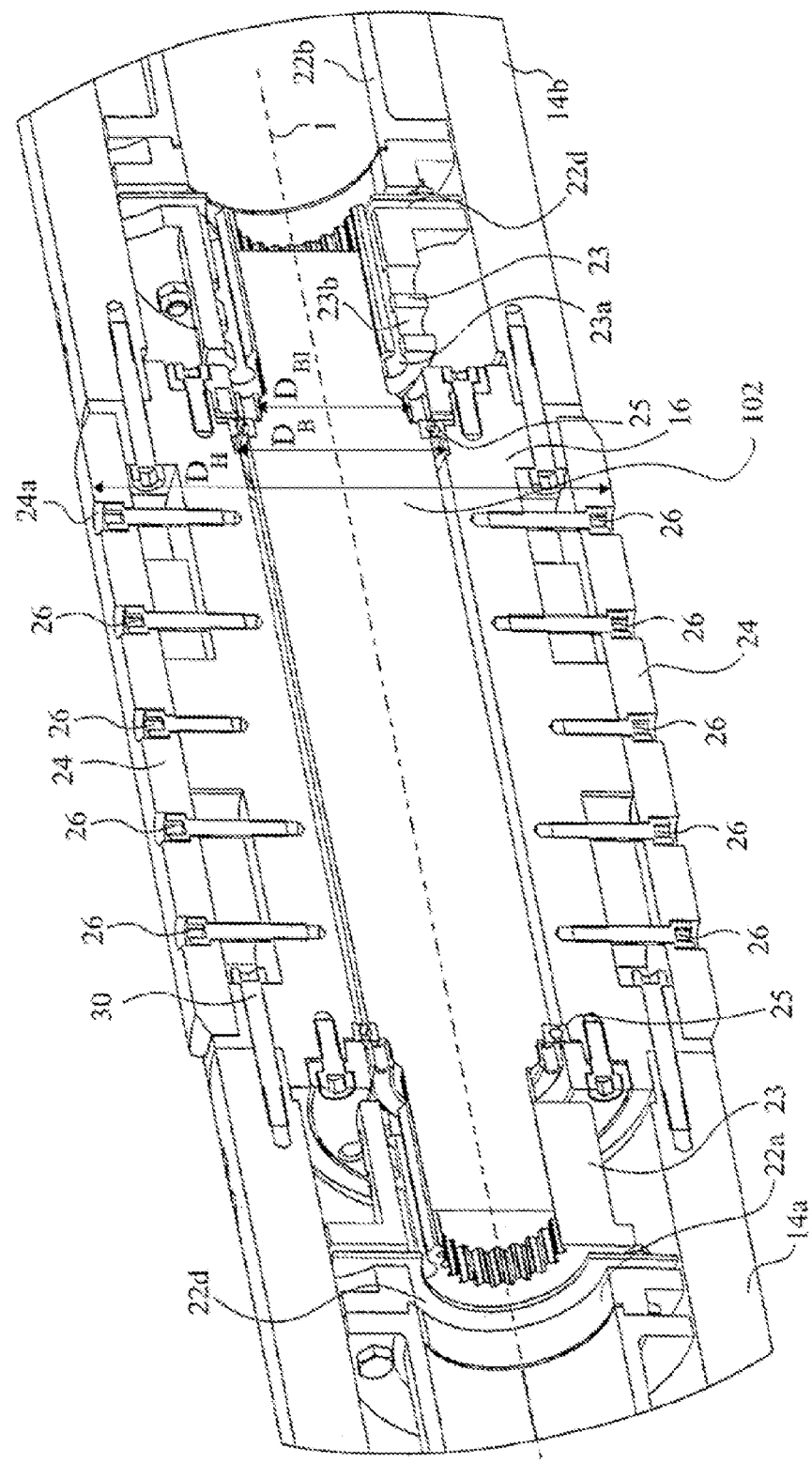
Figure 16:
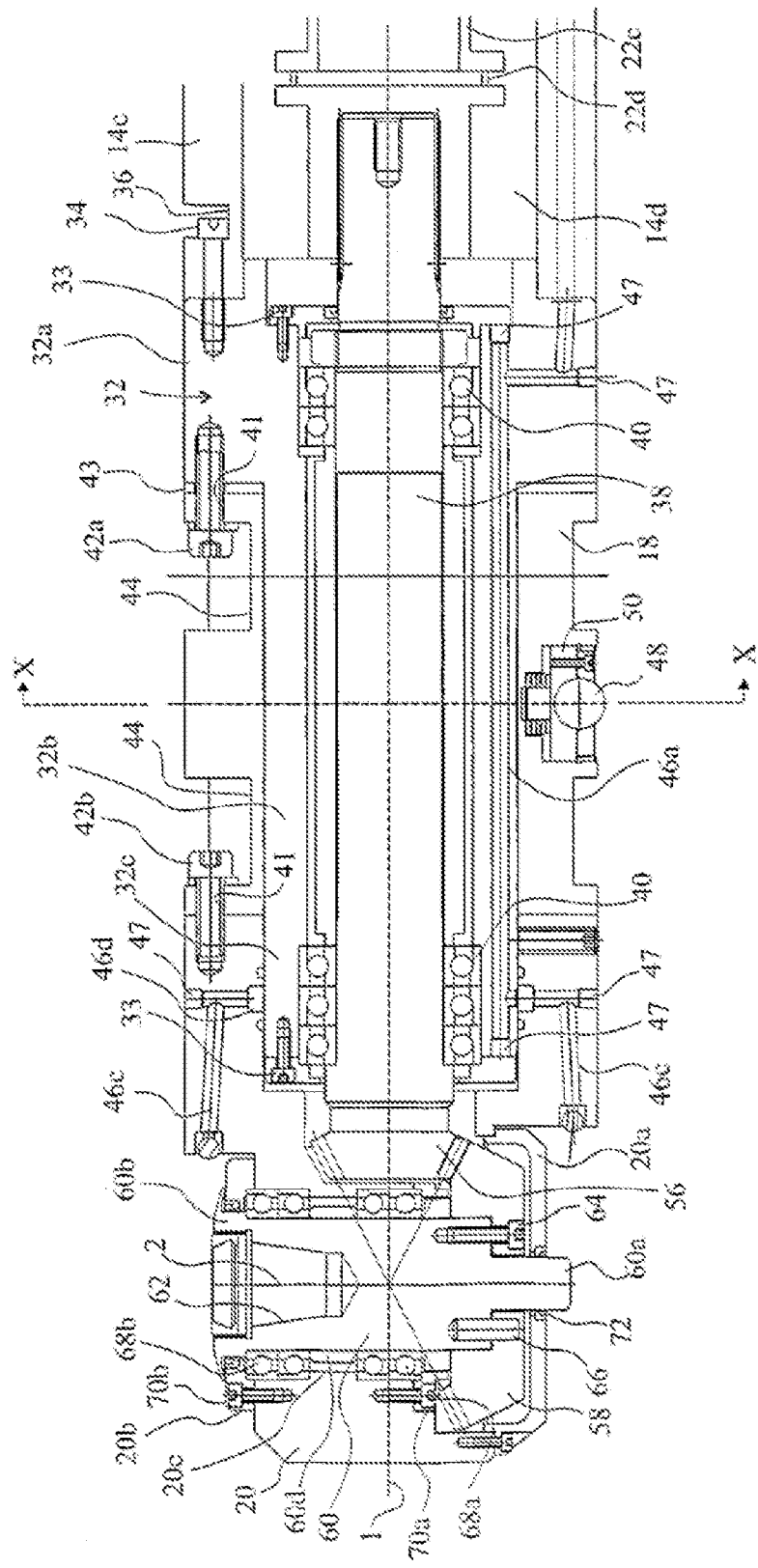
Figure 17:
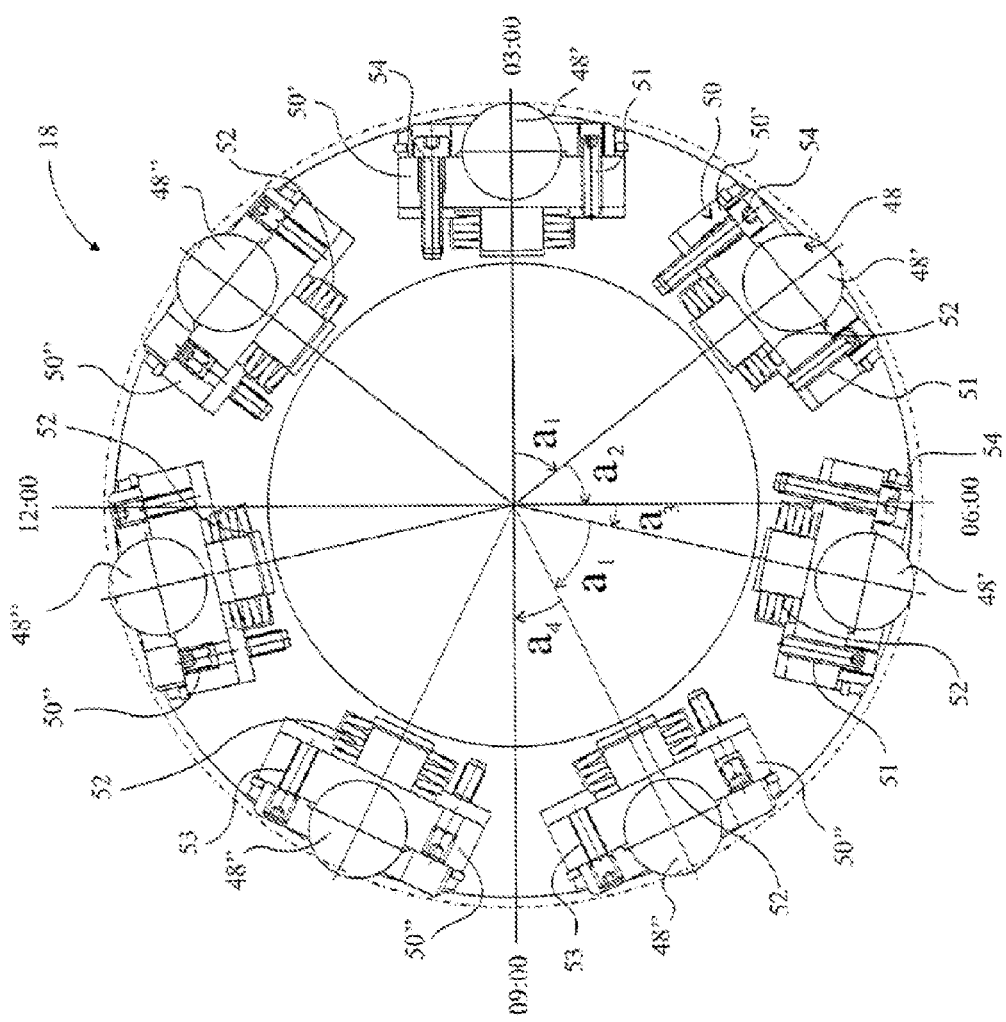
Figure 18:
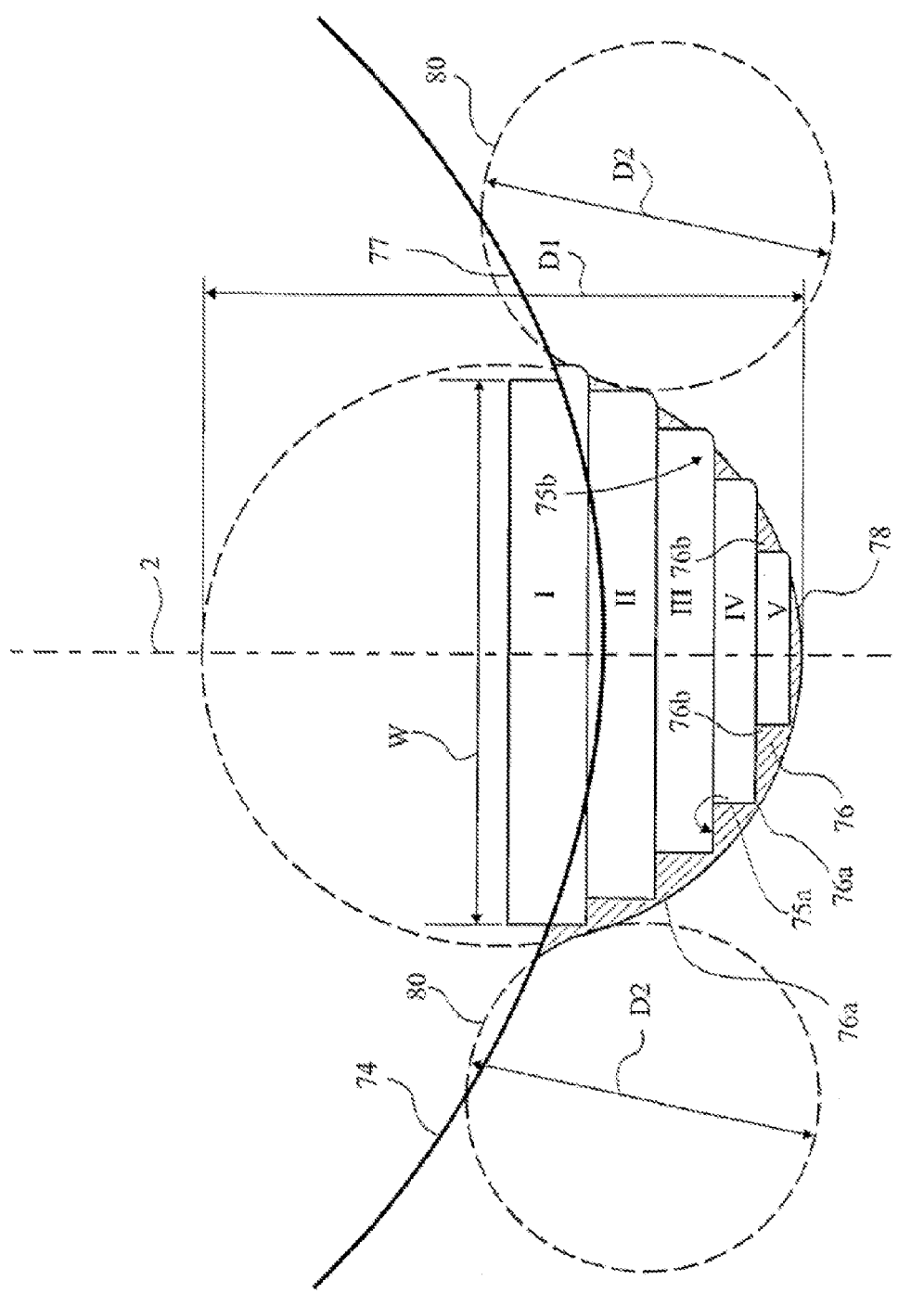
Figure 19:
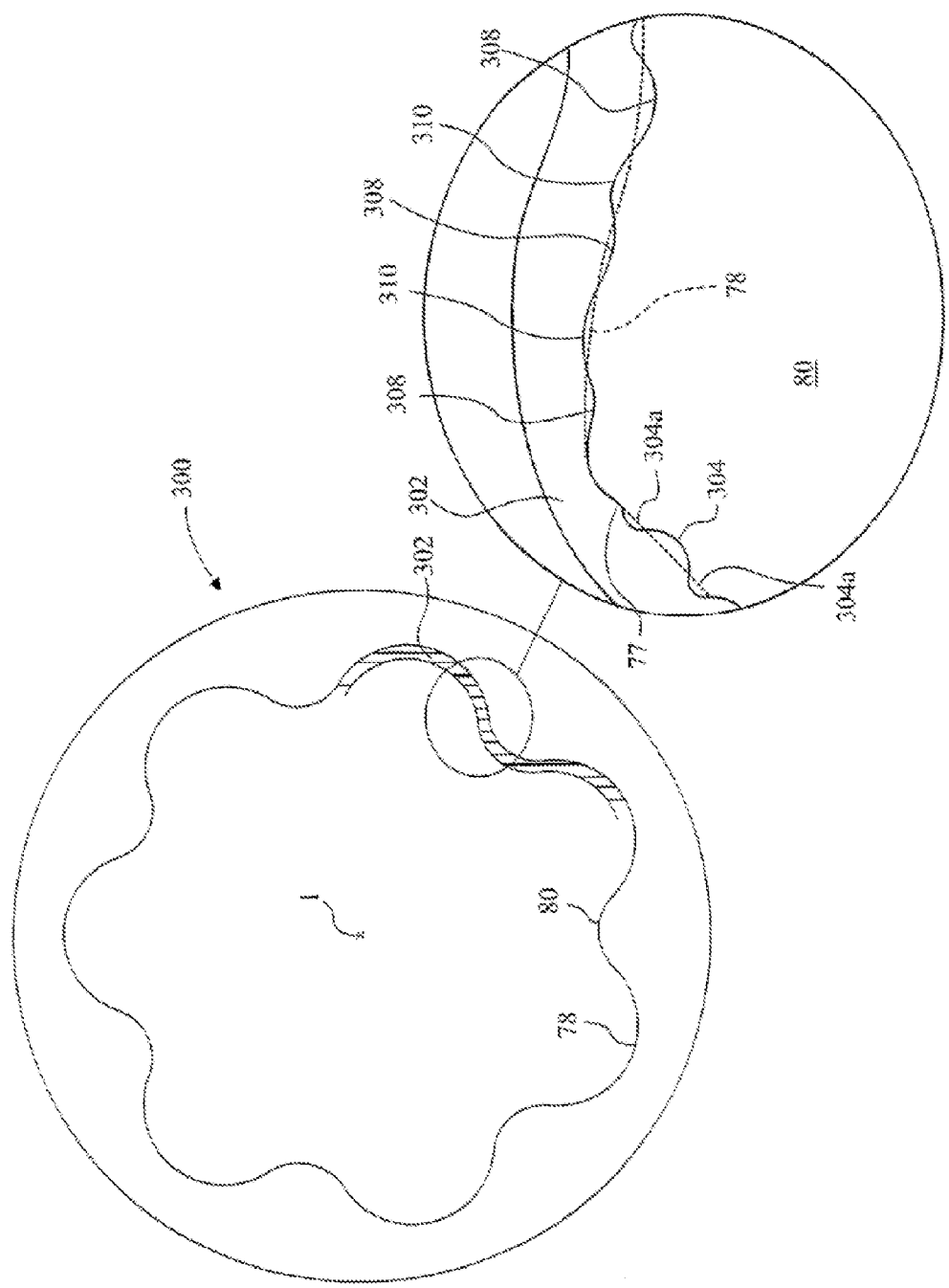

Embodiments of the present invention are further described hereinafter with reference to the accompanying drawings, in which:

FIG. 12 is a schematic of a second embodiment of the long reach spindle drive system;

FIG. 13 is a sectional side view of the drive system of FIG. 4;

FIG. 14 is a sectional perspective view of a clamp housing and clamp assembly of FIG. 4;

FIG. 15 is a sectional perspective view of the bearing housing and plane shaft of FIG. 4 connecting two extension tubes and shafts respectively;

FIG. 16 is a sectional side view of an adapter plate, steady assembly and spindle head of FIG. 4;

FIG. 17 is a section view along line X-X of the steady assembly of FIG. 8;

FIG. 18 is a diagram illustrating the tool bits and method for machining a groove on the inner surface of a workpiece;

FIG. 19 is a cross-section view a workpiece subsequent to machining; and

Figure 20:
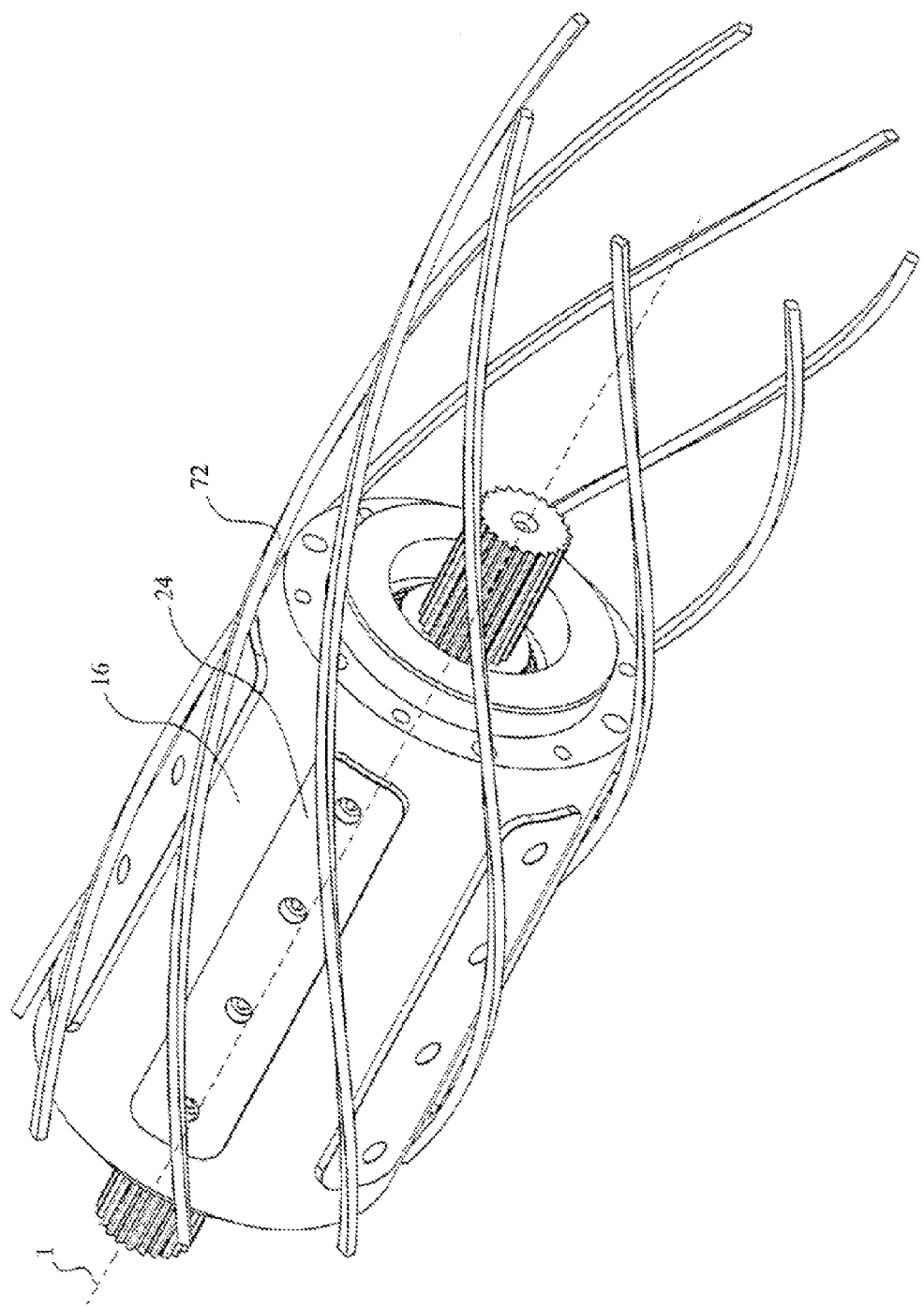

FIG. 20 is a perspective view of the bearing housing of FIG. 7 with paths of the lobes illustrated.

In the following, a reference to FIG. N (where N is any of 4 to 12) is actually a reference to FIG. AN. Moreover, reference numerals in this Appendix refer to the numerals in FIGS. 12 to 20.

FIG. 12 shows a schematic diagram of the long reach spindle drive system 100', 500'. The drive system comprises a motor 10, a clamp housing 12, extension tubes 14*a-c*, bearing housings 16, a steady apparatus 18 and a spindle head 20. The extension tubes 14*a-c* are separated from one another by the bearing housings 16. In the embodiment disclosed in FIG. 12, the extension tubes 14*a-c* consist of a motor extension tube 14*a*, an intermediate extension tube 14*b* and a milling extension tube 14*c*. The extension tubes 14*a-c* are housing sleeves which envelop line shafts 22*a-c* (see FIG. 13). Akin to the nomenclature of the extension tubes 14*a-c*, the shafts consist of motor shaft 22*a*, an intermediate shaft 22*b* and a milling shaft 22*c*. Although the embodiment disclosed in the foregoing description comprises three extension tubes 14*a-c* and shafts 22*a-c*, the skilled reader will understand that the present invention is not limited to this case, such that other embodiments may comprise a number n of extension tubes and shafts, and for the case where n>1, the embodiments may include (n−1) bearing housings 16 separating the extension tubes and shafts.

From the sectional view of the drive system shown in FIG. 13, it can be seen that the motor 10 has a rotary output 10*a* which has a non-circular constant cross section and engages with a socket in a clamp assembly 12*a* disposed within the clamp housing 12. The clamp assembly 12*a* is fixed to a proximal end of the motor shaft 22*a* and permits vibration-free and substantially inelastic transfer of torque from the rotary output 10*a* to the motor shaft 22*a*.

FIG. 14 gives a more detailed view of the clamp assembly 12*a*. Preferably, an angularly flexible coupling 12*b* is employed comprising a hollow laminar disc alternately clamped to the line shaft 22*a* and clamp 12*a*. In addition, the clamp assembly 12*a* may comprise mechanical and/or electrical means to monitor and limit torque that is transferred to the motor shaft 22*a*. For example, a torque limiter (not shown) may be incorporated to prevent an overload situation and thus prevent damage to components down the transmission line.

The shafts 22*a-c* comprise hollow cylindrical tubes and extend away from the clamp assembly within the bores 14*d* of the extension tubes 14*a-c*. For the purpose of angular rigidity, these are as large a diameter as possible, which enables them to be constructed as relatively thin-walled tubes. At a distal end, relative to the clamp assembly 12*a*, the motor shaft 22*a* comprises a shaft coupling 23 (see FIG. 15) which receives one end of a plane shaft 102 which is disposed within the bearing housing 16. The plane shaft 102 has a non-circular cross section and engages with the complimentary shaft coupling 23 such that they are drivingly connected allowing torque to be transferred from the rotating motor shaft 22*a* to the plane shaft 102 without slipping. In the embodiment disclosed in FIG. 15, the ends of the plane shaft 102 are splined where the splines engage with complimentary grooves in the ends of the shafts 22*a-c*. Axial arcuately-sectioned bore 23*a* thins the wall of the coupling 23 near the splines of the shaft 102. Threaded bores 23*b* intersect the axial bore 23*a* and permit grub screws (not shown) to clamp the thinned wall on the plane shaft 102, removing any slack in the rotary connection between them, while still retaining concentricity. Radial bores in the wall of the extension tubes permit access of a key to operate the grub screws.

The plane shaft 102 is journalled for rotation within a bore of the bearing housing 16 by bearings 25. Bearing retainers may hold the bearings 25 in place. The bearing housing 16 is sealed to prevent unwanted material entering and disrupting operation. The bearings are small, considering the size of the components being supported. However, this is surprisingly necessary for two reasons. Firstly, the forces to be absorbed by the bearings are minor, comprising essentially just the weight of the line shafts 22 and the plane shaft 102. Secondly, large bearings require large preloads in order to take up inevitable backlash. Consequently, small bearings can absorb the minor forces being generated and secondly require less preload which means they are relatively freer running. While the bearings are small, however, that only means in terms of bulk, not of diameter, which is as large as possible to retain the angular rigidity of the system. Indeed, the bearings should not have the smallest diameter of any part of the drive system. Specifically, they should be larger than the couplings 23 which in the present embodiment have the smallest diameter and consequently the most potential twist for a given torque. Thus the bearings are preferably at least 50 mm in outside diameter with an outside to inside diameter difference of less than 10 mm. Indeed, in one embodiment, the outside diameter is 65 mm and the outside-to-inside diameter difference is 15 mm. However, this depends on the outside diameter $D_H$ of the bearing housing 16, such that the ratio R, of bearing outside diameter $D_B$ to bearing housing outside diameter $D_H$ is preferably between 30 and 60%. The bearing housing in the present example has an outside diameter of 150 mm (R=0.43). Moreover, the outside to inside bearing diameter difference ($D_B$-$D_{BI}$) is preferably between 10 and 30% of DB (($D_B$-$D_{BI}$)/$D_B$=0.23). Preferably, the bearing housing outside diameter $D_H$ is between 50 and 200 mm. This, of course, is also the internal diameter of the bore of the tube. The length (L) of the tube is preferably between 2 and 5 m, whereby the ratio of tool diameter to reach ($D_H$/L) is between 1/100 and 1/10, preferably between 1/60 and 1/20.

The bearing housing 16 also comprises a plurality of contact plates 24 which are affixed to the outer surface of the bearing housing 16 by several screws 26. When the contact plates 24 are attached, the screw heads of the screws 26 sit deep within the screw holes 24a of the contact plates 24. The screws 26 are disposed radially in the screw holes 24a relative the tube axis 1. This provision gives the operator of the drive system the flexibility to reduce the thickness of the contact plates 24, by grinding for example, without interfering with the screws 26 and thus not affecting the secure attachment of the contact plates 24 to the bearing housing 16. An operator may wish to do this when fine-tuning the drive system to machine a workpiece with a particular internal diameter. Likewise, of course, the contact plates could be shimmed up to increase their diameter.

The bearing housings 16 are fixed to the extension tubes 14a-c by bolts 30 which are parallel the tube axes. The user can gain access to the bolts 30 via recesses 28 in the bearing housing 16. With the contact plates 24 screwed in place, the recesses 28 are covered by the contact plates 24 which prevent further access to the bolts 30.

The bearing housings 16 may further comprise cross-drilled holes that line up with similar passageways in the extension tubes 14a-c. The cross-drilled passageways connected through the extension tubes 14a-c and bearing housings 16 may be used for supplying cooling air to the spindle head 20 and to blow waste material clear of the tool bit to prevent the machining process from re-processing the waste material that would decrease tool bit life and increase power requirements. Lubricants may also be supplied to the spindle head 20, to keep running temperatures at an acceptable level and ensure adequate lubrication is provided throughout its running life. Electrical connections can be passed through to the spindle head 20 to connect transducers to measure torque/ vibration or angle of twist of the assembly due to machining torque, or any other form of electrical control required at the head. In certain aspects, the spindle head 20 has an input/ output ratio that suits optimum process requirements required for spindle speed and torque.

In FIG. 16, it can be seen that the milling extension tube 14c connects to an adapter plate 32 by several bolts 34 (only a single bolt 34 is visible in FIG. 16). The bolts 34 can be accessed by the user via recesses 36 in the milling extension tube 14c. Within the milling extension tube 14c, the milling shaft 22c connects to a tool input shaft 38 by another angularly and axially flexible (but radially rigid) coupling 22d, like the coupling 12b described above between the motor shaft 22a and motor output 10a. Indeed, there is ideally such a coupling between each line shaft 22 and bearing shaft 102. The tool input shaft 38 has a non-circular constant cross section (splined, for example) and engages in a complimentary coupling 23 of the milling shaft 22c such that the two 38, 22c are drivingly connected (clamped as with grub screws and arcuate slot (not shown), as described above). The adapter plate 32 has an internal diameter greater than the external diameter of the tool input shaft 38 but less than the outer diameter of the milling extension tube 14c. The adapter plate 32 comprises a first section 32a, a second section 32b and a third section 32c. The first section 32a has an outer diameter substantially equal that of the milling extension tube 14c. The second section 32b extends from the first section 32a along the length of the tool input shaft 38 and has an outer diameter less than the first section 32a. The tool input shaft 38 is journalled for rotation within a bore of the adapter plate 32 by two sets of collar bearings 40. The adapter plate 32 has screws 33 which retains the collar bearings 40, allowing them to be preloaded as desired.

When assembling the system, the steady apparatus 18 is slotted over the second section 32b and attached to the first section 32a with bolts 42a (only one such bolt 42a is visible in FIG. 16). A spacer (or shim) 43 separates the steady apparatus from the first section 32a and is held tightly therebetween by bolts 42a. Once the steady apparatus 18 is attached to the adapter plate 32, the spindle head 20 may be installed onto the remaining, third section 32c of the second section 32b protruding from the steady apparatus 18. The spindle head 20 is attached to the steady apparatus by bolts 42b (only one such bolt 42b is visible in FIG. 16). Bolts 42a,b may by accessed by the user through recesses 44 in the surface of the steady apparatus 18. Note that the spindle head 20 is affixed to the steady apparatus 18 only and is not directly bolted to the adapter plate 32, such that if the bolts 42a were not present, the spindle head 20 and steady apparatus 18 would be free to collectively rotate about the tube axis 1 relative the adapter plate 32.

In the embodiment disclosed in FIG. A 8, the adapter plate 32 comprises passageways 46a which connect cross drilled passageways 46b of the milling extension tube 14c to cross drilled passageways 46c of the spindle head 20. Passageways 46a-c may be formed by drilling, where ends may be sealed by seals 47 to create the desired passageway path. That path includes a circular groove 46d in the spindle head 20 surrounding the third section 32c of the adaptor plate. Thus drillings 46a can connect with the passageways 46c, regardless of the relative rotational orientation of the spindle head to the adaptor plate around the axis 1 of the tool input shaft 38.

The steady apparatus 18 is independent from the system of passageways 46a-c. The steady apparatus serves to push a plurality of ball bearing contacts 48 against the inside of the workpiece and push the spindle head 20 against the opposing side. This ensures a consistent depth of material removal, increases stiffness, and reduces vibration of the spindle head 20 and tool. The steady apparatus 18 is better understood with reference to FIG. 17.

In FIG. 17, the ball bearings 48 are mounted in sockets 50 which are loaded onto springs 52. Sockets 50' are retained by screws 54 and are prevented from radial movement of the sockets 50 and ball bearings 48' therein by grub screws 51 that selectively increase the apparent thickness of the sockets 50'. Conversely, remaining ball bearings 48" are free to move radially with their respective sockets 50" on springs 52 because grub screws are missing or withdrawn from the corresponding bores 53 in the sockets 50". It is desirable that a fixed ball bearing 48' contacts the inside of the workpiece in opposition to the tool head to resist movements thereof. The ball bearing arrangement shown in FIG. 17 is such that forces perpendicular to the tube axis 1 arising from the tool bit working on the workpiece, are rigidly resisted from the approximate 10:00 position indicated.

For reasons explained further below, the rotational position of the steady apparatus 18, which is also referred to as a gauge means, about the axis 1 on the adaptor plate 32 is arranged to be infinitely variable. At least, it is in the sense that the ball bearing contacts 48 are disposable in any (or at least, many different) angular orientations with respect to the adaptor plate. The screws 42a, 42b that clamp the steady apparatus 18 to the adaptor plate 32 are disposed in bores in the adaptor disposed on four quadrants 12:00, 03:00, 06:00 and 09:00. The steady apparatus 18 of FIG. 17 has seven equally angularly spaced ball bearing contacts 48, separated from each other by 51.4°, meaning that there are five different angles between any contact 48 and a quadrant, namely, 0°, $a_1$=51.4°, $a_2$=(90−51.4)=38.6°, $a_3$=(2$a_1$−90)=12.9, and 12=(90−$a_1$−$a_3$)=2$a_3$=$a_1$/2=25.7°. Thus, if the apertures 41 in the steady apparatus through which the screws 42a,b are received are arcuate, centred on the axis and permit a minimum of 12.9° of adjustment, all angular positions of the steady apparatus with respect to the adaptor 32 can be achieved. Indeed, in the general case, where there are m screws 42b and x ball bearings 48, then the minimum circumferential extent p of the arcuate slots 41 is given by p=360°/($f_1$(m,x)), where $f_1$(m,x) is some function based on the values of m and x that returns the number of possible different orientations of the steady apparatus 18 with respect to the tool head 20 and its tool holder 60.

Likewise, the minimum circumferential extent q of the arcuate slots 41 through which n screws 42b pass depends on a number of factors including the extent p determined already and the number m and n of screws 42a,b. However, the skilled person can determine what is required in order to achieve both any angular orientation of the tool bit output 60 with respect to the adaptor plate 32 and hence with the end sleeve 14, and any angular orientation of the ball bearings 48 with respect to the tool bit output 60.

Both of these adjustment possibilities exist for the reasons explained below. However, returning now to FIG. 16, it can be seen that the tool input shaft 38 terminates within the spindle head 20. At the terminating end of the input shaft 38, a first helical bevel gear 56 engages with a complimentary second helical bevel gear 58 on the tool output shaft 60. The tool output shaft 60 is disposed parallel to a tool axis 2 within the spindle head, and is perpendicular with respect to the tool input shaft 38 and tube axis 1. The second bevel gear 58 is fixed to the lower end of the tool output shaft 60 by a screw 64 and dowel 66. Together, the screw 64 and dowel 66 respectively prevent unwanted axial and shear movement of the bevel gear 58 relative to the tool output shaft 60. The tool output shaft 60 is journalled for rotation by two pairs of bearings 68a,b within the spindle head 20.

A lower end 60a of the tool output shaft 60 is set in an aperture 72 of the lower portion 20a of the spindle head 20. The two pairs of bearings 68a,b are held in place and preloaded by sets of washers and associated screws 70a,b. The washers 70a,b squeeze between them the outer races of the bearings 68a,b against an inner flange 20c of the spindle head 20. The inner races are squeezed between a flange 60c of the output shaft 60, a spacer 60d and the bevel gear 58. However, a spacer 58a intervenes and determines the axial position (in relation to the axis 2 of the tool output shaft 60), of the bevel gear 58. This is important so that the gear 58 meshes precisely with the bevel gear 56. Indeed, by the same token, the thickness of the spacer 43 determines the axial position (in relation to the axis 1 of the tool input shaft 38), of the bevel gear 56. The tool output shaft 60 has an upper end 60b which protrudes through an upper portion of the spindle head 20. The upper end 60b comprises a tool spindle 62 for securely receiving a tool bit and transferring torque to it. The connection thereof is known and need not be explained further.

One method for working the inside surface 74 of the workpiece is best understood with reference to FIG. 18. The workpiece (a hollow steel cylinder, which is to form the stator of a progressive cavity pump or motor) is inserted over the spindle head 20 and extension tubes 14a-c. In one embodiment, the ball bearings 48 score or indent the inner surface 74 of the workpiece as the workpiece is passed over them. So that the scoring is beneficial for future passes of the workpiece over the ball bearings 48, it is preferable that the workpiece be rotated about the tube axis 1 as it is inserted onto the extension tubes 14a-c. Provided this is done, the scores will act to guide the workpiece over the ball bearings 48 in subsequent working passes explained further below, the scores forming tracks to be repeatedly followed by the balls 48. When the workpiece is in place, the long axis of the workpiece (the "workpiece axis") is substantially concentric with the tube axis 1 and the spindle head 20 protrudes from the open end of the workpiece at the opposite end proximal the motor 10.

A first shallow and broad milling tool bit I (FIG. 18) is then inserted into the tool spindle 62 and fixed in place and the motor 10 is switched on. With the tool bit I spinning, the tool 100',500 is translated along the tube axis 1 in a direction away from workpiece, and the workpiece is simultaneously rotated about the tube axis 1. First milling tool bit I has a thickness T and width W and has a rectangular cross section when viewed perpendicular to the tool axis 2 (although see also below). As the workpiece is translated with respect to the tool bit I, the bit I mills a helical groove in the inner surface 74. After the first pass, i.e. when the tool bit has been translated such that a groove has been milled from one end of the workpiece to the other, the tool bit I is removed, the workpiece is once again placed over the extension tubes 14a-c, and the bit I is re-inserted prior to performing the second pass. It should be noted that the tool bit might not necessarily be removed and reinserted after the tool 100',500 has been relocated in the workpiece. Instead, the tool could simply be tracked back up the workpiece with the tool bit I following the course of the groove made during the preceding milling operation. Indeed, in that event, the motor will continue to operate to ensure that the tool bit does not jamb. The workpiece could be indexed round the axis 1a small amount to accommodate two potentially desirable effects. The first might be so that the tool bit tracks centrally down the groove cut, bearing in mind that, however torsionally stiff the line shafts 14 are, there will inevitably be some twist of them during machining that will need to be accommodated on the return pass (where there will be no corresponding twist to keep the bit central). The second might be to ensure that a cut is, in fact, made on the return pass. This may be just a small amount to ensure that there is not merely some rubbing of the tool against previously milled surfaces, since this will have the effect of dulling the tool bit's edge.

In fact, in principle, there is no reason why the return path cannot make a full cut of a new groove. However, if this is arranged, then there will need to be support elements put in place to keep the line shafts 14 straight and concentric with the axis 1. These support elements would need to be removable as the motor 10 progressed axially with respect to the workpiece. Adjacent the workpiece, the support element would need to extend 360° around the axis 1 in order to support the tool head in all directions and ensure only one degree of freedom, in the direction of the axis 1. However, a hinged clamshell-type arrangement would be one possible arrangement.

Both the foregoing options (of retracking the tool bit down its groove or cutting a new groove in the reverse direction) are only suggested for the purpose of efficient use of time and are not essential. What is important, however, is returning the tool to its start position so that it can make second and further passes through the workpiece.

During the second pass, the tool I mills an identical groove to the first but at a different circumferential location in the surface 74 of the workpiece. Subsequent passes produce the required number of grooves and lobes, which, with a seven ball 48 support, will be seven grooves. Once all passes have been performed with tool bit I, the process is repeated with tool bit II. Tool bit II is smaller in thickness and width in comparison to tool bit I, but penetrates further (i.e., radially more distant from axis 1) into the workpiece. Repeating the process with tool bit II deepens the depth of the grooves increasing the relative height of the lobes 80 between them (see FIG. 19). Similarly, further passes with subsequent tool bits III to V removes material to form a step-like groove 75a in the inner surface 74. The remaining material 76 (shaded in FIG. 18) can be removed by an additional pass with a suitably shaped tool bit to form the final profile 78. The resulting circular section groove 78 has ("major") diameter D1, and is circumscribed by protruding circular lobes 80 of ("minor") diameter D2. Indeed, the profile of the lobes 80 is such that the circle of diameter D2 intrudes into the surface 74 of the workpiece so that a "flat" crown 77 is formed on each lobe 80. It is not, of course, flat at all, but has the profile of the original bore 74. It is only flat in the sense of being equidistant from the centre of rotation, axis 1.

Although it could be conceived that a single pass with an appropriately shaped tool bit would create the desired grooves 78 and lobes 80, such a method would put huge demands on the tool bit and would produce a large amount of long swarf, the efficient removal of which may be problematic. While the embodiment disclosed in FIG. 18 uses tool bits I-V, having rectangular cross sections, the skilled person will appreciate that other embodiments will encompass the use of tool bits with different cross sections to produce the desired profile 78,80. Indeed, tool bit V may be arranged also to remove the shaded part under it, since, to have a tool bit that is wide enough to remove the triangles of material adjacent the lobes 80, it will either have to rotate too fast to remove them efficiently, or too slowly to remove the central part (under tool bit V).

Although FIG. 18 shows the tool bits I-V as having a rectangular section and leaving continuous ligaments 76a between each step produced by each tool bit, neither of these is preferred. On the right of FIG. 18, the profile of the tool bits I-V is different in two respects from the profiles on the left. Firstly, the diameter W of each tool bit is larger, so that they protrude into, and result in some of, the final profile 78. The effect of this is explained below.

Secondly, the corners of each tool bit are not sharp but smoothly contoured so that the internal corners of the profile 75b after all the tool bits I-V have passed are smoothly curved. Again, the effect of this is explained further below.

Also, although the tool bits I to V are described as being radially transverse in the holder 60, rotating about radially transverse axis 2, there is a case for inclining the tool bit rearwardly. The effect of such inclination is to remove the point of zero motion (the centre of rotation of each tool bit), from contact with the workpiece. Consequently, although the tool holder 60 is shown radial with respect to the common axis 1 of the tool head, it could with perhaps some advantage be inclined.

Indeed, of course, it is to be noted that the motor is variable speed so that the tool rotates at an appropriate speed for the task in hand. It is to be noted, in any event, that the gear 56/58 is speed reducing. This has several effects. The first is that it reduces the torque loading on the drive train up to the tool output shaft, whereby the load on the bearings 25 is reduced. As a result of the reduced torque, there is less twist so that the line shaft appears stiffer and as reduced torsional vibration which improves tool life. It also means that the diameter of the bevel gear 56 is small, meaning that the gear 58 can be closer to the axis 1 and is less likely then to protrude into the solid section of the workpiece.

FIG. 19 shows an example cross section of a workpiece 300 looking down the workpiece axis 1. The grooves 78 and lobes 80 are clearly visible. Indeed, the workpiece may be destined to form the stator of a mud motor or other progressive cavity machine and may ultimately be coated with a layer 302 of elastomeric material that cushions and seals contact between a rotor (not shown) and the stator 300. In the inset to the drawing is shown an enlarged part of a lobe 80. The layer 302 may be affixed by any convenient means but current procedures involve the deposition of a layer of primer followed by a layer of adhesive prior to application of the elastomer. It is well known that sharp external corners of solid objects bleed liquids applied to the object away from the corner, so that, in the case of adhesives, insufficient adhesive may be present to effect a strong bond at such sharp edges. It is also well known that sharp indents cause liquids to pool in the indents. In the case of adhesives, this may have the effect of preventing proper curing or increasing the depth of the adhesive, either of which may result in ineffective bonding. On the other hand, it is also known that the greater the surface area, and the rougher the surface area, the better the strength of bond can be.

It is for these reasons therefore that the curved profile 75b is preferred. Furthermore, while the bottom corner 308 of each tool bit I-V is smoothly curved, (thereby preventing pooling of adhesive), it also penetrates into "final" profile 78. This means that at no time do any ligaments 76a join adjacent triangles 76b. Therefore the formation of long swarf particles is avoided when the final tool bit removes the triangles 76b. The actual final profile may also leave curved peaks 310 between the corners 308 which, again, are not sharp enough to cause depletion of adhesive. Nevertheless, they are significant enough that, with the corners 308, there is an increase in the surface area of the tube for bonding to the elastomer layer 302. So, not only does the disclosed embodiment provide an effective method for forming the helical channels 78 of a stator, but may also improve the strength of attachment of the elastomeric layer when that is adhered to it. Indeed, the peaks 310 and corners 308 define undulations in the flanks of the lobes 80

The inset to FIG. 19 also shows a dent 304 in its crown 77 that is caused by repeated tracking of the balls 48 as the tool is drawn back and forth through the stator 300. This dent is important in the machining process described above.

When the tool is first inserted in the bore, at least one, and possibly several more, trial passes are made of the tool so that the balls 48 do indent tracks 304 in the bore. These dents not only penetrate the surface 77 but also swage out a lip 304a on either side. The precise dimensions of the dents and lips can be determined based on simple calculations knowing the hardness of the materials of the balls 28 and tube 300, as well as the forces exerted by the springs 52. However, more importantly, the dents and lips resist twisting of the tool while it is cutting the profile 78. The reaction of the tool bit is circumferential with respect to the axis 1 and so the balls must ride up over the lips 304a compressing the springs 52. The forces required to cause any movement up the lips is of course, substantial, so that this effect causes the torsional rigidity of the tool to be significantly increased.

Incidentally, because the dent 304 has the radius of the balls 48 it does not cause pooling of the adhesive when that is alter applied. Nor are the lips 304a sharp to cause depletion. Consequently, these features also promote strong adhesion of the elastomeric layer to the bore of the stator 300.

Turning back to FIG. 16, the spindle head 20, steady apparatus 18 and adapter plate 32 are all rotatable about axis 1 with respect to one another. This freedom of rotation is such that all combinations of configurations are possible with respect to the orientation of the spindle head 20 and ball bearings 48 of the steady apparatus 20. This is important in establishing the most efficient damping and hold of the workpiece. The orientation of the ball bearings 48 with respect to the configuration of the tool is also important since it is desired that the ball bearings 48 contact and ride along the lobes 80 created when machining the inner surface 74 of the workpiece.

Likewise, the adjustability of the adapter plate 32, steady apparatus 18 and spindle head 20 relative the bearing housings 16 allows the lobes 80 to contact the contact plates 24 providing support for the workpiece. It is preferable that each contact plate 24 is in contact with at least two lobes 80 at any one time when machining. FIG. 20 shows the paths 72 of the lobes 80 passing over the contact plates 24 of the bearing housing 16 as the workpiece is translated on its along the tube axis 1 and simultaneously rotated about the tube axis 1.

In operation of the tool, it may be desirable that the tool bit can be oriented at any angle with respect to the workpiece, without having to disturb the clamp 12, 12'a. Thus, it may be that pressing the tool bit to one side, or vertically upwardly, clears swarf most effectively. Secondly, it is desirable that the number of grooves, their pitch and their lead should all be selectable according to the requirements of the eventual apparatus, be that a progressive cavity pump or motor or other apparatus. Thus the number of grooves determines the number of lobes between them, and hence the number of gauge elements 48. Since there is inevitably an axial separation between the tool and the steady apparatus 18, then the angular position of the steady apparatus must be closely correlated with the pitch and lead of the helical grooves, which of course are determined by the number of grooves (at least in the case of the pitch) and the relative rate of rotation of the tube around the tool and the rate of draw of the tool through the tube.

Alternative embodiments may have graduations on any or all of the spindle head 20, steady apparatus 18 and adapter plate 32 to assist the user in establishing the desired configuration thereof in relation to the pitch P of the helical grooves 78 and their lead L, being the length of a single complete rotation of a given groove 78.

Certain embodiments of the present invention provide one, some, or all of the following:
a. Rigidly held line shafts supported at intervals;
b. Bearing housings providing support to keep line shafts straight;
c. Increased rotational speed due to a. and b. above;
d. Increased shaft Polar second moment of area compared to a small diameter solid shaft;
e. Increased torque transmission;
f. Increased stiffness for shaft;
g. Increased power;
h. Reduced mass moment of inertia;
i. Accommodation of bending and misalignments (lateral/axial/angular);
j. Differential thermal expansions are accommodated (by line shafts);
k. Services are connectible through cross-drilled passageways;
l. Ease of manufacture for short sections to tight tolerances is possible ensuring a good fit in a workpiece and increasing stiffness and lower vibration during machining (increasing tool life);
m. Ease of assembly/maintenance;
n. Sections can be added or removed in line with workpiece length;
o. Internal steady apparatus reduces vibration and increases consistency of cutting depth; and
p. The line shaft has the flexibility to accommodate axial (caused by thermal effects) and angular (caused by head movement and bend) misalignment, and can be used to help with spindle head design in smaller cross-sections, to move the centre of rotation of the spindle head away from the axis of the PTO.

The invention claimed is:

1. A machining system for machining the interior of a member, the system comprising:
   a spindle system positionable within a member, the spindle system including a housing and a rotatable spindle disposed in the housing, and a machining item connected to and rotated by the rotatable spindle;
   a motor system adjacent the spindle system, the motor system positionable within the member with the spindle system, and the motor system for driving the rotatable spindle within the member to rotate the rotatable spindle and the machining item;
   a pipe system having a longitudinal axis and being connected at one end to at least one of the motor system and the spindle system and extending out of the member and being connected at its other end to a base;
   wherein the member and the base are mounted to ground such that the member and the base are movable with respect to one another along an axis through the member and the pipe system; and
   wherein the pipe system comprises:
      first and second pipe members, both being connected rotationally fixedly to said at least one of the motor system and the spindle system, and the first pipe member being connected to said base;
      a rotation system, connected to the second pipe member to twist the second pipe member with respect to the base;
      an inclinometer, connected to said spindle system or said motor system to detect the rotational position of the item with respect to said longitudinal axis; and
      a control to actuate the rotation system upon detection in a change of said rotational position so as to maintain said position.

2. The machining system of claim 1, wherein: the motor system includes a motor, and gear apparatus connected to the motor and to the spindle system.

3. The machining system of claim 1, wherein the member is made of material and the machining affects one of treatment of the material and removal of material.

4. The machining system of claim 1, wherein the motor system includes two motors.

5. The machining system of claim 4, wherein the two motors are spaced-apart, each motor being separately connected to the spindle system.

6. The machining system of claim 5, wherein: the spindle system comprises a bevel gear connected to said rotatable spindle and the output of each motor is a gear meshing with said bevel gear.

7. The machining system of claim 4 in which the motors are in tandem with a first of them driving the second, and the second driving the spindle system.

8. The machining system of claim 4, wherein each motor has an associated gear apparatus.

9. The machining system of claim 4, further comprising: a control system for controlling the motor system, said control system comprising a feedback loop for sensing the speed of the system and for increasing the torque of at least one of the motors when the speed slows below a threshold speed.

10. The machining system of claim 1, further comprising a drive to drive the base with respect to the member along said longitudinal axis.

11. The machining system of claim 10, further comprising a drive to rotate the base with respect to the member about said longitudinal axis.

12. The machining system of claim 1, wherein said second pipe member is concentric with or is within said first pipe member.

13. The machining system of claim 1, wherein said rotation system comprises one of:
   a pulley on a flange on the end of said second pipe member driven by a servomotor to twist the second pipe member about said longitudinal axis;
   a lever on the end of said second pipe member driven by a pneumatic or hydraulic cylinder to twist the second pipe member about said longitudinal axis; and
   a lever on the end of said second pipe member driven by a lead screw mounted on said base and driven by a servomotor to twist the second pipe member about said longitudinal axis.

14. The machining system of claim 10, further comprising: a steady system connected to one or both of the spindle system and motor system and bearing against the member, whereby reaction forces orthogonal to said longitudinal axis are resisted.

15. The machining system of claim 1, in which the member is a tube and the machining item is a milling cutter, the tube when machined forming a stator for a progressing cavity device.

16. The machining system of claim 15, wherein the stator is a stator of a downhole tool, preferably a motor.

17. A method for machining a member, the method comprising
   positioning a machining system as claimed in claim 1 within the member, and
   energizing the motor to drive the rotatable spindle so that the machining item machines the member.

18. The method of claim 17, wherein said machining item is a milling tool and said machining comprises removing material of the member.

19. The method of claim 17, wherein the machining system comprises the motor system including two motors and a control system for controlling the motor system, said control system comprising a feedback loop for sensing the speed of the system and for increasing the torque of at least one of the motors when the speed slows below a threshold speed, the method further comprising:
   increasing the torque applied by at least one of the motors when the system slows below said threshold speed.

20. The method of claim 19 wherein the method is for making a member into a stator for a downhole motor, the method further comprising machining the member to form a stator for a downhole motor.

21. The machining system of claim 1, wherein one or both said pipe members are hollow, one is disposed inside the other, and wherein both pipe members are configured to extend out of the interior of the member through the same open end of the member.

* * * * *